(12) United States Patent
Verlaan

(10) Patent No.: US 11,501,329 B1
(45) Date of Patent: Nov. 15, 2022

(54) TRANSMISSION OF PROMOTIONAL INFORMATION DURING A PROMOTIONAL CAMPAIGN TO USER ELECTRONIC EQUIPMENTS

(71) Applicant: JT INTERNATIONAL SA, Geneva (CH)

(72) Inventor: Theo Verlaan, Geneva (CH)

(73) Assignee: JT INTERNATIONAL SA, Geneva (CH)

( * ) Notice: Subject to any disclaimer, the term of this patent is extended or adjusted under 35 U.S.C. 154(b) by 0 days.

(21) Appl. No.: 17/667,448

(22) Filed: Feb. 8, 2022

(51) Int. Cl.
    *G06Q 30/02* (2012.01)
    *G06F 3/16* (2006.01)
    *H04W 4/35* (2018.01)
    *H04W 4/021* (2018.01)
    *G10L 19/018* (2013.01)

(52) U.S. Cl.
    CPC ......... *G06Q 30/0241* (2013.01); *G06F 3/165* (2013.01); *G10L 19/018* (2013.01); *H04W 4/021* (2013.01); *H04W 4/35* (2018.02)

(58) Field of Classification Search
    CPC ...... G06F 3/165; G06F 40/169; G06F 16/909; G06Q 20/4015; G06Q 30/02; G06Q 30/0201; G06Q 30/0241; G06Q 30/0248; G06Q 30/0267; G06Q 30/0269; G06Q 30/0273; G06Q 30/0643; G06Q 30/0207; G06Q 30/0212; G06Q 30/0233; G06Q 30/0261; G06Q 50/01; G10L 19/018; G11B 27/322; H04M 15/735; H04M 1/724; H04N 21/2547; H04N 21/466; H04W 4/021; H04W 4/35; G07G 5/00; H04L 67/306

USPC .... 705/2, 14.1, 14.4, 14.47, 16, 26.9, 14.12, 705/14.13, 14.23, 14.33, 14.41, 14.53; 725/34, 13

See application file for complete search history.

(56) References Cited

U.S. PATENT DOCUMENTS

| | | | | |
|---|---|---|---|---|
| 6,076,071 A * | 6/2000 | Freeny, Jr. | ......... | G06Q 30/0643 |
| | | | | 705/14.1 |
| 8,578,408 B2 * | 11/2013 | Tom | .................. | H04N 21/2547 |
| | | | | 725/35 |
| 9,230,260 B2 * | 1/2016 | Williams | ............... | G06Q 30/02 |
| 9,906,653 B2 * | 2/2018 | Celik | .................. | H04M 15/735 |
| 10,026,062 B1 * | 7/2018 | Sasmaz | .................... | G07G 5/00 |
| 10,540,700 B1 * | 1/2020 | Chilukuri | .............. | H04W 4/021 |
| 10,810,625 B1 * | 10/2020 | Moser | ................. | G06Q 30/0267 |
| 10,872,353 B2 * | 12/2020 | Price | .................. | G06Q 30/0269 |
| 2008/0201731 A1 * | 8/2008 | Howcroft | ............. | H04N 21/466 |
| | | | | 348/E7.071 |
| 2010/0211431 A1 * | 8/2010 | Lutnick | .............. | G06Q 30/0212 |
| | | | | 705/14.12 |
| 2012/0072272 A1 * | 3/2012 | Kilar | .................... | G11B 27/322 |
| | | | | 705/14.4 |

(Continued)

*Primary Examiner* — Gerald Gauthier
(74) *Attorney, Agent, or Firm* — Chip Law Group

(57) ABSTRACT

Provided is a system that transmits a notification to a user electronic equipment associated with a user, based on a user location information. This notification includes information representative of a sound-based promotional campaign for a product at a location known by the user. The system also transmits a location-specific promotional information, associated with this sound-based promotional campaign and based on a user information, to a merchant electronic apparatus associated to this known location.

19 Claims, 4 Drawing Sheets

(56) References Cited

U.S. PATENT DOCUMENTS

| | | | |
|---|---|---|---|
| 2012/0089470 A1* | 4/2012 | Barnes, Jr. | G06F 40/169 705/16 |
| 2013/0073388 A1* | 3/2013 | Heath | G06Q 50/01 705/14.53 |
| 2013/0304559 A1* | 11/2013 | Stone | G06Q 30/0233 705/14.33 |
| 2014/0006129 A1* | 1/2014 | Heath | G06Q 30/02 705/14.23 |
| 2014/0095293 A1* | 4/2014 | Abhyanker | H04L 67/306 705/319 |
| 2014/0122195 A1* | 5/2014 | Tabor | G06Q 30/0207 705/14.13 |
| 2014/0303991 A1* | 10/2014 | Frank | G06Q 30/0201 705/26.1 |
| 2014/0304068 A1* | 10/2014 | Weinblatt | G06Q 30/0248 705/14.47 |
| 2014/0324627 A1* | 10/2014 | Haver | G06Q 30/0273 701/519 |
| 2017/0109789 A1* | 4/2017 | Major | G06Q 30/0261 |
| 2020/0302421 A1* | 9/2020 | Stickels | G06Q 20/4015 |
| 2020/0327165 A1* | 10/2020 | Evseroff | G06F 16/909 |

\* cited by examiner

TRANSMISSION OF PROMOTIONAL INFORMATION DURING A PROMOTIONAL CAMPAIGN TO USER ELECTRONIC EQUIPMENTS

FIELD

The present disclosure relates generally to the transmission of promotional information during promotional campaign to user electronic equipments, and to the use of such promotional information. More specifically, the disclosure relates to transmission of promotional information during a promotional campaign to user electronic equipments.

BACKGROUND

It has been proposed, notably in the patent document US 2014/0304068 A1, to broadcast offers related to a retail establishment over loudspeakers inside and/or outside this retail establishment. These offers may be defined by inaudible codes that are comprised into ultrasonic signals broadcasted by the loudspeakers and received by a user electronic equipment of a user, such as a smartphone, for instance, temporarily located inside or in the vicinity of the concerned retail establishment. Once received by a user electronic equipment the ultrasonic signals are processed to extract their inaudible codes and the latter are used to define an offer message that is displayed on a screen of this user electronic equipment to inform its user of the pending offer.

Such a promotional campaign is not very effective because the users need to be located inside or outside the concerned retail establishment to be inform of the pending offer during a promotional campaign. Moreover, a significative part of users having been informed of the pending offer is usually not interested with this pending offer, which still reduces the number of persons that effectively benefit from this offer.

Accordingly, it would be beneficial to improve the situation to increase the number of users that could be interested with an offer during a promotional campaign.

SUMMARY

A system and method for transmitting location-specific promotional information based on user information during promotional campaign to (user) electronic equipments, but also a (user) electronic equipment for receiving and using such location-specific promotional information, are provided substantially as shown in, and/or described in connection with, at least one of the figures, as set forth more completely in the claims.

The features, functions and advantages that have been discussed above and are described below in details can be achieved independently in various examples or may be combined in other examples. Further details of the examples can be seen with references to the following description and drawings.

BRIEF DESCRIPTION OF THE FIGURES

The novel features believed characteristics of the illustrative examples are set forth in the appended claims. The illustrative examples, however, as well as preferred modes of use, further objectives and descriptions thereof, will be better understood upon reading the following detailed description, which is given solely by way of non-limiting examples and which is made with reference to the appended drawings, wherein:

DETAILED DESCRIPTION

Figure 1:
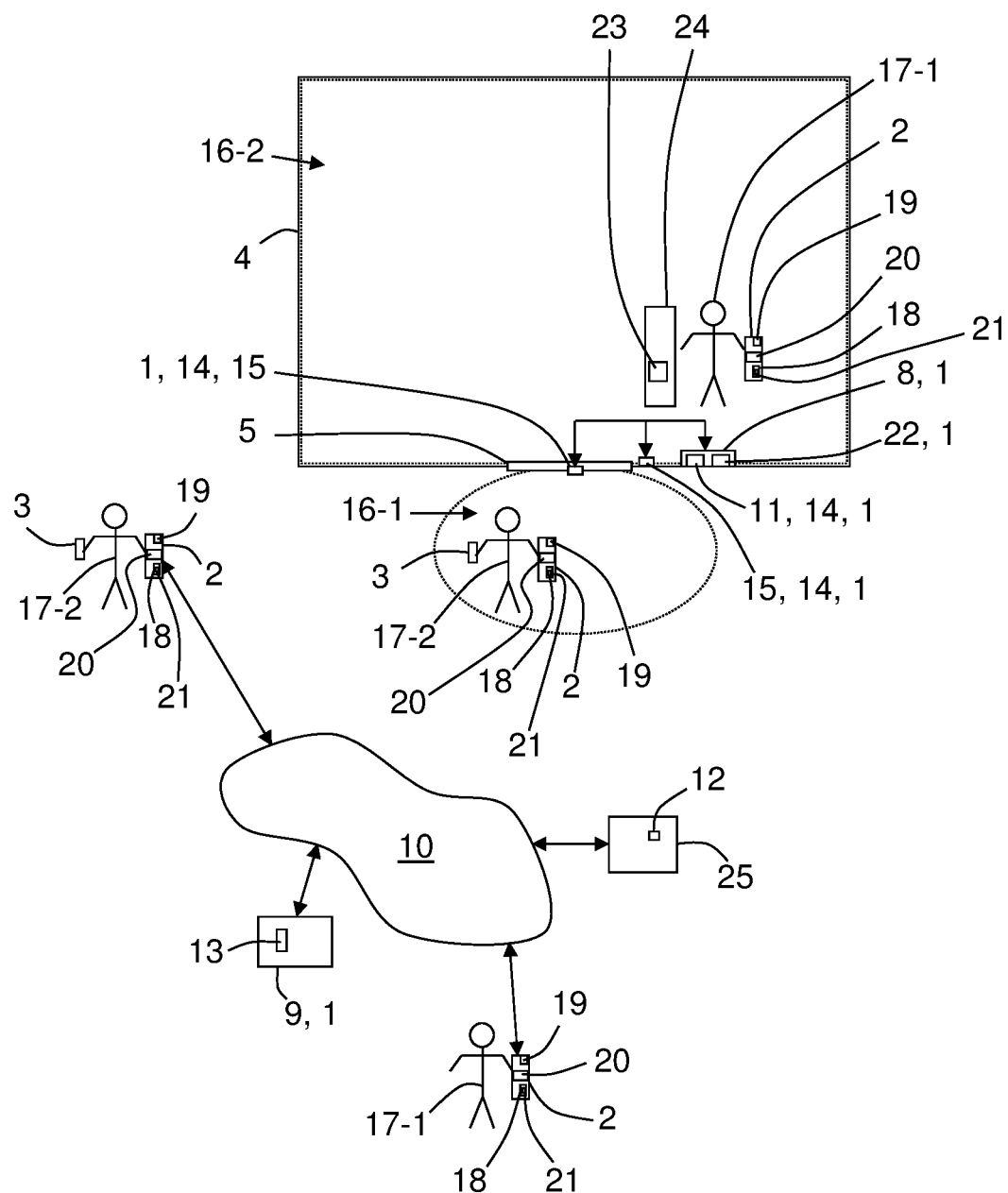
FIG. 1 is a diagram that schematically and functionally illustrates an example of system according to an embodiment of the disclosure coupled to a merchant electronic apparatus of an establishment that is visited by users of an electronic equipment according to an embodiment of the disclosure to see and possibly buy product(s) concerned by an offer of a promotional campaign.

The present description is directed notably to a system 1 and a method for transmitting location-specific promotional information based on user information during promotional campaign to (user) electronic equipments 2 arranged for receiving and using such location-specific promotional information.

In the following description it will be considered that the (user) electronic equipment 2 is a smartphone. Notwithstanding, the user electronic equipment 2 could be of another type than a smartphone, as long as it may be used and carried by a user and comprises a communication interface and a microphone 19. So, for instance, the user electronic equipment 2 could be also an electronic tablet or a laptop.

Each (user) electronic equipment 2 is carried by a user 17-k which also possibly carries an electronic device 3. Such an electronic device 3 may be a vaping device, like an E-vapor device or a T-vapor (or heat-not-burn) device producing an aerosol by heating an aerosol-forming substance mixed with air during a vaping session of its user. But it could be also an aerosol generation device, an electronic cigarette, or a tobacco and/or nicotine delivery device.

In the following description the letter k associated to the reference numeral 17 is used to designate different users of a (user) electronic equipment 2 and also possibly of an electronic device 3.

Figure 2:
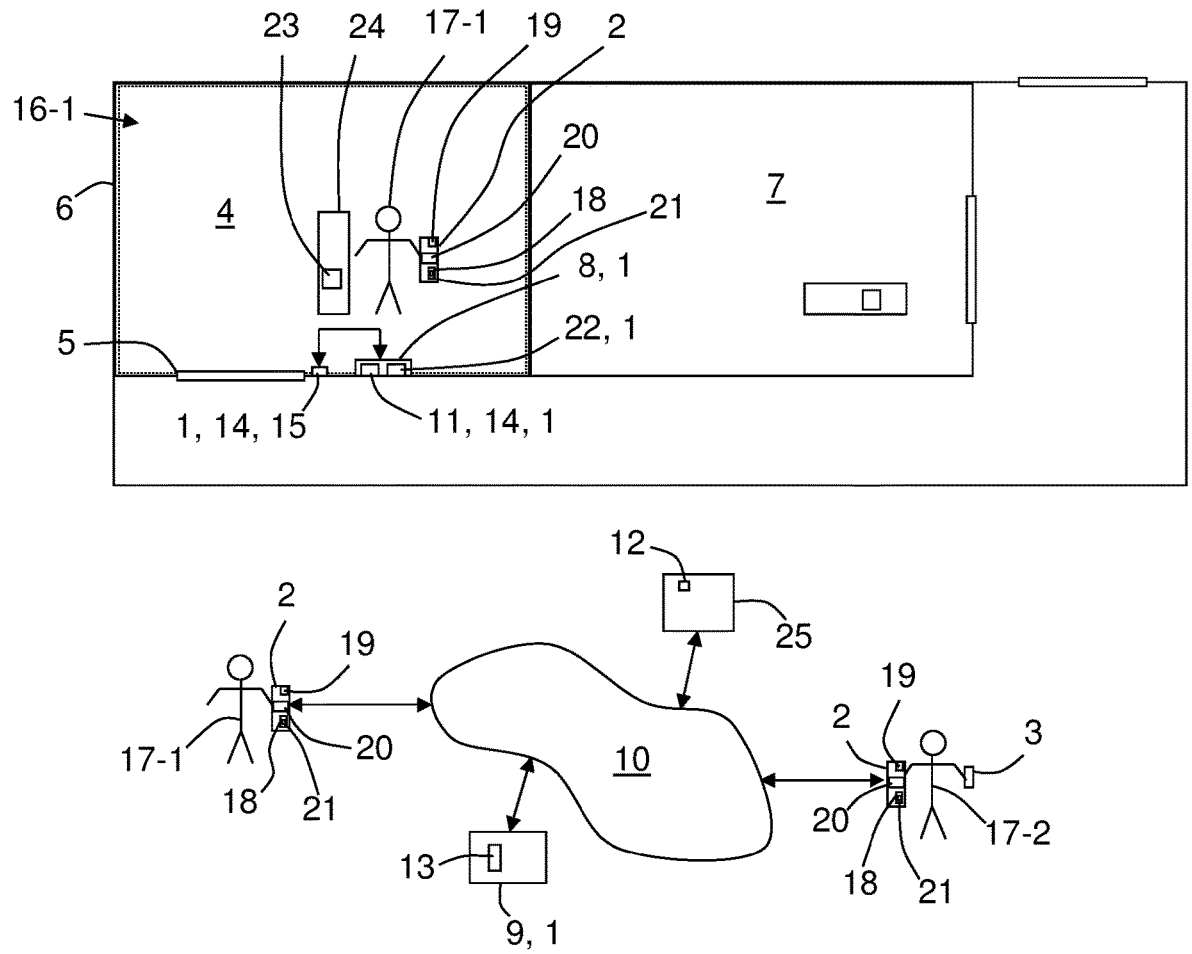
FIG. 2 is a diagram that schematically and functionally illustrates an example of system according to an embodiment of the disclosure coupled to a merchant electronic apparatus of an establishment located in a shopping mall and that is visited by users of an electronic equipment according to an embodiment of the disclosure to see and possibly buy product(s) concerned by an offer of a promotional campaign.

An example of system 1 according to an embodiment of the disclosure is schematically illustrated in FIGS. 1 and 2. In the first example illustrated in FIG. 1 the system 1 is coupled to a merchant electronic apparatus 8 having a communication interface 22 coupled to a communication network 10 and located in a first establishment 4 that may be visited by users of an electronic equipment 2 to see and possibly buy product(s). In the second example illustrated in FIG. 2 the system 1 is also coupled to a merchant electronic apparatus 8 having a communication interface 22 coupled to a communication network 10 and located in a first establishment 4 that is located in a shopping mall 6 further comprising a second establishment 7. For instance, in both examples the first establishment 4 may be a shop or store (or retail establishment). But it could be also a restaurant or a bar, for instance. It is important to note that the merchant electronic apparatus 8 may be part of the system 1 as illustrated, but this is not mandatory (indeed, it may be an equipment of the first establishment 4).

As illustrated in FIGS. 1 and 2, a system 1 according to the disclosure comprises at least a first circuitry 13 and possibly a sound signal output device 14 comprising a control part 11 and at least one loudspeaker 15. It is important to note that the sound signal output device 14 may be part of the system 1 as illustrated, but this not mandatory (indeed, it may be an equipment of the first establishment 4 (such as a public address (or PA) system or a background music system, for instance)). In the non-limiting examples of FIGS. 1 and 2, the control part 11 of the sound signal output device 14 is housed in the merchant electronic apparatus 8, but this not mandatory. Accordingly, the control part 11 of the sound signal output device 14 could be located in a box coupled to the merchant electronic apparatus 8 and located in the first establishment 4.

The use of loudspeakers 15 is advantageous because they are readily available and easy to install, and still more advantageous when they are already equipping rooms and/or zones of a first establishment 4 and therefore may be used without additional cost.

As illustrated in the non-limiting examples of FIGS. 1 and 2, the first circuitry 13 may be comprised into a server 9 of the system 1 that may be accessed via at least the communication network 10.

The first circuitry 13 of system 1 comprises at least a processor and a memory arranged for performing operations. For instance, the (each) processor may be a digital signal processor (or DSP), or an application specific integrated circuit (ASIC), or else a field programmable gate array (FPGA). More generally, the processor may comprise integrated (or printed) circuits, or several integrated (or printed) circuits connected therebetween through wired or wireless connections. The term "integrated (or printed) circuits" refers here to any type of device capable of carrying out at least one electric or electronic operation. Also, for instance, the memory may be a random access memory (or RAM). But it may be any type of device arranged for storing program instructions for the associated processor.

Generally speaking, the functions of the first circuitry 13 may be carried out through the operation of program logic, through dedicated logic, through the interaction of program control and dedicated logic, or even partially manually (by a user). These functions may be provided through the use of dedicated hardware as well as hardware capable of executing software in association with appropriate software.

The first circuitry 13 may also comprise, in addition with its processor(s) and memory(ies), an input interface, a mass memory (notably for storing intermediate data produced during its calculus and processing), and an output interface for delivering messages and instructions.

Figure 3:
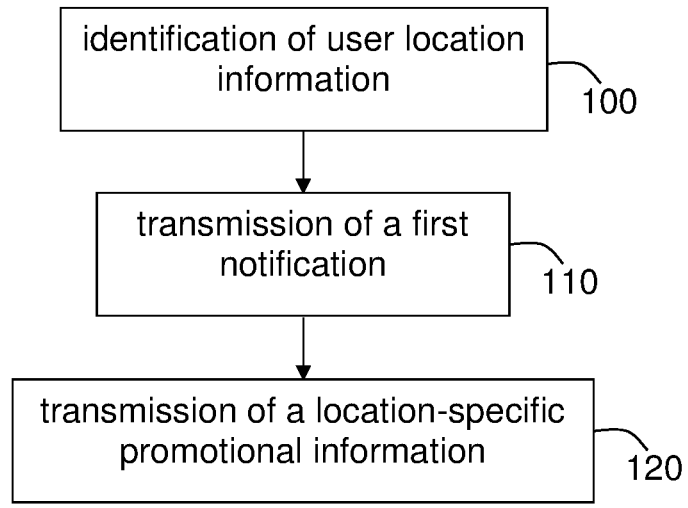
FIG. 3 is a diagram that schematically illustrates a first example of algorithm implementing a method according to an embodiment of the disclosure and that may be implemented by a system according to an embodiment of the disclosure.

As illustrated in FIG. 3, the first circuitry 13 is configured to carry out at least three operations 100-120.

The first operation 100 includes identifying location information of a user 17-$k$ based on user information associated with this user 17-$k$.

The second operation 110 includes transmitting a first notification to the user electronic equipment 2 associated with this user 17-$k$, based on this identified location information. This first notification includes information representative of a sound-based promotional campaign for at least one product at at least one location known by the user 17-$k$. For instance, this location may be the first establishment 4.

The third operation 120 includes transmitting a location-specific promotional information, associated with this sound-based promotional campaign and based on this user information, to a merchant electronic apparatus 8 associated to this location concerned by the sound-based promotional campaign (here the first establishment 4).

So, when the manager of a first establishment 4 has informed the server 9 of his decision to start a sound-based promotional campaign for at least one product, the first circuitry 13 determines each user 17-$k$ that is considered to be a client of this first establishment 4 in user information preferably stored in a database 12. To this effect the first circuitry 13 identifies every user information including location information representative of the location of the concerned first establishment 4. Then the first circuitry 13 transmits a first notification to each user electronic equipment 2 associated with a user 17-$k$ associated to an identified location information, in order this user 17-$k$ be informed of the pending sound-based promotional campaign at the first establishment 4 as will be explained below. Then, if a user 17-$k$ is interested with the pending sound-based promotional campaign at the first establishment 4 he must go to the latter (4) with his user electronic equipment 2 in order to receive a location-specific promotional information associated to this pending sound-based promotional campaign previously transmitted by the server 9 to the merchant electronic apparatus 8 associated to the first establishment 4.

In accordance with various embodiments of the disclosure, all the users 17-$k$, which have previously visited (and been registered in) a location 4 where there is a pending promotional campaign, may be informed of the latter, even if they are not in the vicinity of this location 4.

As illustrated in a non-limiting way, the database 12 may be located in a server 25 accessible via at least the communication network 10 and associated, for instance, with a manufacturer or a distributor of a (each) product concerned by the pending sound-based promotional information. But the database 12 could be located in the server 9, and therefore could be part of the system 1.

For instance, in an embodiment the database 12 may be configured to store the user information and a plurality of locations associated with a plurality of pieces of location-specific promotional information including the location-specific promotional information concerned by the pending sound-based promotional campaign. In this case each plurality of locations associated with a user 17-$k$ includes the (each) location known by this user 17-$k$ and registered. One means here by "pieces" stores or sections of stores (like a kiosk within a supermarket or shopping mall, for instance).

Also, for instance, in an embodiment the location-specific promotional information transmitted to a first establishment 4 may be arranged in the form of encoded information to be combined with audio signals by the merchant electronic apparatus 8 before being broadcasted by the loudspeaker(s) 15 equipping this first establishment 4, or audio signals including encoded information and intended for being broadcasted by the loudspeaker(s) 15 equipping the first establishment 4.

For instance, in the second alternative the first circuitry 13 may be configured to transmit the audio signals including encoded information by streaming to the merchant electronic apparatus 8 for playback at the location concerned by the pending sound-based promotional campaign (here the first establishment 4).

Also, for instance, in an embodiment the location-specific promotional information may define:
a discount coupon (for instance a discount on a purchase or an additional free merchandise), and/or
a voucher, and/or
loyalty points associated with the user information associated to an identified user 17-k, and/or
a digital message associated with the user information associated to an identified user 17-k, and/or
pointer information designating the server 25 associated with the manufacturer or the distributor of the (each) product concerned by the pending sound-based promotional campaign at the location (here the first establishment 4).

In the case of loyalties points, the user 17-k can get them at the concerned location 4 for example each day he has visited this location 4 (or another location belonging to the same brand or company). This will encourage the user to visit the location 4 (or equivalent ones), and improve the foot traffic for the location 4.

Also, for instance, in an embodiment the user information associated with a user 17-k may include:
identification information of this user 17-k, and/or
profile information of this user 17-k (for instance, his age and/or his gender and/or any other basic information identifying this user 17-k), and/or
the location information of this user 17-k, and/or
a purchase history of this user 17-k, and/or
purchase trend information associated with this user 17-k (for instance, the number of purchases per month and/or per location and/or the type of products purchased), and/or
a loyalty membership status information associated with this user 17-k, and/or
a search history related to a (each) product, previously bought by this user 17-k and registered, on an application executable on the user electronic equipment 2, and/or
at least one interest of this user 17-k, and/or
biometric information of this user 17-k, and/or
payment mode information associated with this user 17-k and which may be used to provide, for instance, a coupon in a format compatible with/redeemable with his favourite or usual payment mode.

Also, for instance, in an embodiment the first circuitry 13 may be configured to customize the location-specific promotional information based on the user information. For instance, the customization may be based on the user purchase history or trend. As an example, a user 17-k used to buy only one type of product (such as vaping sticks) in a first establishment 4 may be given a voucher for free additional products of this type (i.e. sticks). As another example, a user 17-k used to buy new models of vaping device every time he goes in a first establishment 4 may be given a discount coupon for his next purchase of vaping device.

Also, for instance, in an embodiment the first circuitry 13 may be configured to transmit the first notification to a user electronic equipment 2 as a text message (or SMS ("short message")) or an electronic mail (or email) or else an application notification via an application executable on the user electronic equipment 2. Such an application may be a dedicated application, possibly a proprietary one. For instance, it could be a loyalty scheme (or ploom) application.

In an embodiment, the disclosure may also be considered as a method comprising at least three operations 100-120 as illustrated in the non-limitative example of algorithm of FIG. 3. Such a method may be implemented at least partly by the system 1 described above.

In a first operation 100 of this method, one (the first circuitry 13) identifies location information of a user 17-k based on user information associated with this user 17-k.

In a second operation 110 of this method, one (the first circuitry 13) transmits a first notification to the user electronic equipment 2 associated with this user 17-k, based on the location information identified for him during the first operation 100. As mentioned above, this first notification includes information representative of a sound-based promotional campaign for at least one product at at least one location 4 known by this user 17-k. A location is considered as known by a user 17-k when the latter (17-k) has visited at least one time this location and has been registered.

In a third operation 120 of this method, one (the first circuitry 13) transmits a location-specific promotional information, associated with this sound-based promotional campaign and based on the user information (associated with the user 17-k), to a merchant electronic apparatus 8 associated to the location concerned by the sound-based promotional campaign (here the first establishment 4).

As mentioned above each location-specific promotional information, concerning a sound-based promotional campaign and received by a merchant electronic apparatus 8, is intended to be transmitted at the location 4 comprising the latter (8) to a user electronic equipment 2 having previously received a first notification and whose users 17-k are arrived at this location 4 because they are interested with the pending sound-based promotional campaign.

Such user electronic equipment 2, which may be a smartphone, for instance, comprise a second circuitry 18 comprising at least a processor and a memory arranged for performing operations. For instance, the (each) processor may be a digital signal processor (or DSP), or an application specific integrated circuit (ASIC), or else a field programmable gate array (FPGA). More generally, the processor may comprise integrated (or printed) circuits, or several integrated (or printed) circuits connected therebetween through wired or wireless connections. Also, for instance, the memory may be a random access memory (or RAM). But it may be any type of device arranged for storing program instructions for the associated processor.

Generally speaking, the functions of the second circuitry 18 may be carried out through the operation of program logic, through dedicated logic, through the interaction of program control and dedicated logic, or even partially manually (by a user 17-k).

These functions may be provided through the use of dedicated hardware as well as hardware capable of executing software in association with appropriate software.

The second circuitry 18 may also comprise, in addition with its processor(s) and memory(ies), an input interface, a mass memory (notably for storing intermediate data produced during its calculus and processing), and an output interface for delivering messages and instructions.

Figure 4:
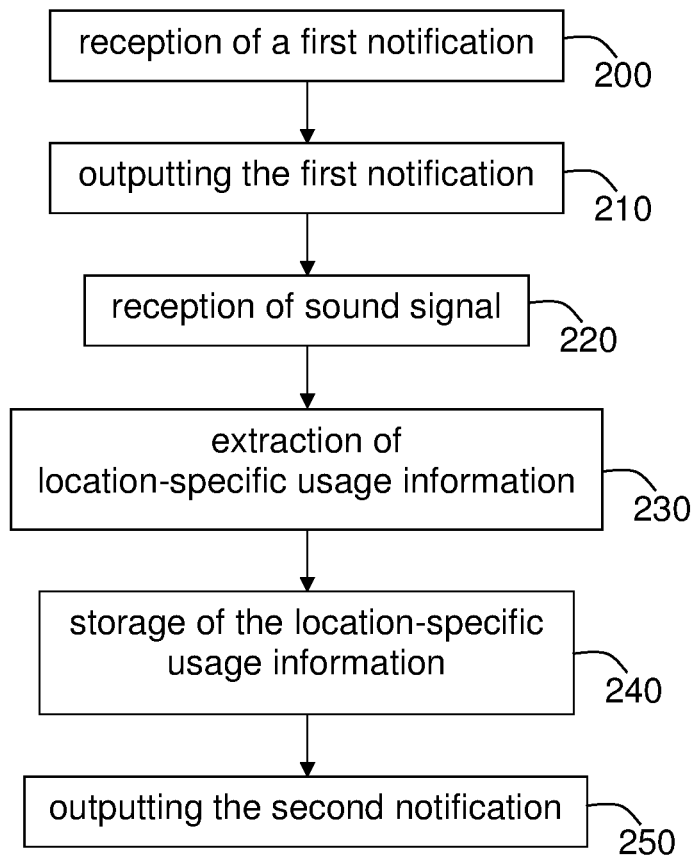
FIG. 4 is a diagram that schematically illustrates a second example of algorithm that may be implemented by a user electronic equipment according to an embodiment of the disclosure.

As illustrated in FIG. 4 the second circuitry 18 is configured to carry out at least five operations 200-240.

A first operation 200 of the second circuitry 18 includes receiving a first notification based on location information of the user 17-k associated with its user electronic equipment 2. It is recalled that the first notification includes information representative of a sound-based promotional campaign for at least one product at at least one location 4 known by the user 17-k of a user electronic equipment 2 (comprising a communication interface capable of receiving first notification (for instance as a text message, electronic mail or application notification)).

A second operation 210 of the second circuitry 18 includes controlling an output device 20 to output the received first notification via an application executable on its user electronic equipment 2. Such an application may be a dedicated application, possibly a proprietary one. For instance, it could be a loyalty (or ploom) application.

As illustrated in the non-limiting examples of FIGS. 1 and 2, the output device 20 may be part of a user electronic equipment 2 carried by a user 17-$k$. But this is not mandatory. Indeed, it could be part of an electronic device 3 (for instance a vaping device), also carried by this user 17-$k$ and associated to his user electronic equipment 2. In this variant of embodiment, the second circuitry 18 of a user electronic equipment 2 is configured to transmit the received first notification to the associated electronic device 3 in order its output device outputs the received first notification to inform its user 17-$k$.

For instance, the output device 20 may be a display screen capable of displaying a text message and/or a loudspeaker capable of playing an audio message.

A third operation 220 of the second circuitry 18 includes receiving a sound signal from a sound signal output device 14 at a location 4 where the sound-based promotional campaign is done and which comprises a merchant electronic apparatus 8 having previously received a location-specific promotional information from the server 9. This sound signal is associated with this sound-based promotional campaign and indicates the location-specific promotional information associated with the (each) product concerned by this sound-based promotional campaign.

As mentioned above, the sound signal output device 14, equipping a location (or first establishment 4), comprises a control part 11 and at least one loudspeaker 15 intended for emitting sound signals in an area 161 located inside or outside this location (or first establishment 4). In the following description the letter j associated to the reference numeral 16 is used to designate different areas of a location (or first establishment 4) where sound signals are emitted by at least one loudspeaker 15.

In the first example illustrated in FIG. 1 the sound signal output device 14 comprises a first loudspeaker 15 emitting sound signals in a first area 16-1 (j=1) located outside the first establishment 4 in the vicinity of its main door 5, and a second loudspeaker 15 emitting sound signals in a second area 16-2 (j=2) located inside the first establishment 4.

In the second example illustrated in FIG. 2 the sound signal output device 14 comprises a single loudspeaker 15 emitting sound signals in an area 16-1 (j=1) located inside the first establishment 4.

But in variants of the embodiments, a sound signal output device 14 may comprise at least one loudspeaker 15 emitting sound signals in at least one area 16-$j$ located outside its first establishment 4, and/or at least one loudspeaker 15 emitting sound signals in at least one area 161' located inside the first establishment 4.

For instance, in an embodiment the second circuitry 18 may be configured to receive the sound signal representing location-specific promotional information) within a pre-defined distance range from the sound signal output device 14. To this effect, at least one of the chosen areas 16-$j$ may have a controllable virtual boundary for application of a corresponding location-specific promotional information. A virtual boundary may be controlled by the intensity and/or by wall(s) delineating a room or a zone of a location (or first establishment 4). The walls of location (or first establishment 4) participate to creation of a geographical delimitation of the sound signal because they prevent the latter to pass through (so they induce a geofencing). Such a delimitation appears to be much more accurate than, for instance, using radio waves (possibly with the Wi-Fi standard) that are not (or slightly) constrained by obstructions like walls. In addition, loudspeaker systems are readily available and easily installed. Existing loudspeaker infrastructure can be used as well.

In the first and second examples illustrated respectively in FIGS. 1 and 2 the areas 16-2 and 16-1 have a virtual boundary totally defined by the walls delineating their first establishment 4 and therefore a surface equal to the surface of their first establishment 4. In the second example illustrated in FIG. 2 the second establishment 7 does not comprise any merchant electronic apparatus 8, and therefore cannot implement a sound-based promotional campaign.

For instance, in an embodiment the sound signal emitted by a loudspeaker 15 may be:

an inaudible standalone sound signal indicating the location-specific promotional information, or an audible sound signal indicating the location-specific promotional information, or else a mixed sound signal that includes a mix of an inaudible sound signal indicating the location-specific promotional information and an audible sound signal.

In the first alternative (inaudible standalone sound signal) the sound signal has an inaudible frequency, and therefore is not disturbing or distracting for users 17-$k$ and the environment. The location-specific promotional information may be encoded into a primary inaudible sound signal.

In the second or third alternative the audible sound may be a natural sound signal, a music (like a background audio or a shop theme song), or an audio advertisement, for instance.

In the third alternative the mixing may be an encoding performed by an audio mixer of the sound signal output device 14. In complex systems 1 the individual loudspeakers 15 may form groups (which preferably correspond to geographic locations with the facility). This makes it easy to distribute the appropriate location-specific promotional information to the concerned locations.

In a variant of the third alternative the mixing may be a simple combination of the location-specific promotional information (represented by the inaudible sound signal) with a primary audible sound signal.

Of course, the third operation 220 can be only performed if the user 17-$k$ is located in an active area 161 (where sound signals representing location-specific promotional information are emitted) with his user electronic equipment 2, and if the latter (2) comprises a microphone 19 adapted to receive the considered sound signals (notably when they are totally or partially inaudible).

A fourth operation 230 of the second circuitry 18 includes extracting the location-specific promotional information from the received sound signal (emitted by a loudspeaker 15 in an active area 16-$j$). Such an extraction may include decoding or decrypting or deciphering, for instance. This depends from the type of the sound signal representing location-specific promotional information.

A fifth operation 240 of the second circuitry 18 includes controlling the application (of its user electronic equipment 2) to store the extracted location-specific promotional information. To this effect the user electronic equipment 2 may comprise a memory (possibly dedicated) 21 for storing each extracted location-specific promotional information.

This extracted location-specific promotional information may be used by a processing device of an electronic cash device 23 equipping the first establishment 4, when a user 17-k (here 17-1 (k=1)), carrying his user electronic equipment 2, is about to pay product(s) just taken in the first establishment 4. As illustrated in FIGS. 1 and 2, the electronic cash device 23 is possibly coupled to the merchant electronic apparatus 8 and possibly set on a counter (or desk) 24 also equipping the first establishment 4.

For instance, the processing device of the electronic cash device 23 may deduce a discount coupon or a voucher stored in memory 21 from the user bill, or may register loyalty points associated with the user information in a database.

Also, for instance, in an embodiment the second circuitry 18 may be configured to control the output device 20 (during a possible sixth operation 250 illustrated in FIG. 4) to output a second notification related to the extracted location-specific promotional information, in order to inform the user 17-k of its user electronic equipment 2 of the offer represented by the extracted location-specific promotional information.

For instance, the second notification may be a text message to be displayed by a display screen of the output device 20 and/or an audio message to be played by a loudspeaker of the output device 20.

Also, for instance, in an embodiment the second notification may include pointer information designating the server 25 accessible via at least the communication network 10 and associated with the manufacturer or the distributor of a (each) product concerned by the pending sound-based promotional information. For instance, the pointer information may be a web-link. In this last embodiment the second circuitry 18 may be also configured to access the server 25 via the application executable on the user electronic equipment 2 or a browser application based on the pointer information. This may possibly allow the user 17-k to access to and/or download additional data by means of his user electronic equipment 2. This will increase brand connections and intensify contact with clients.

Figure 5:
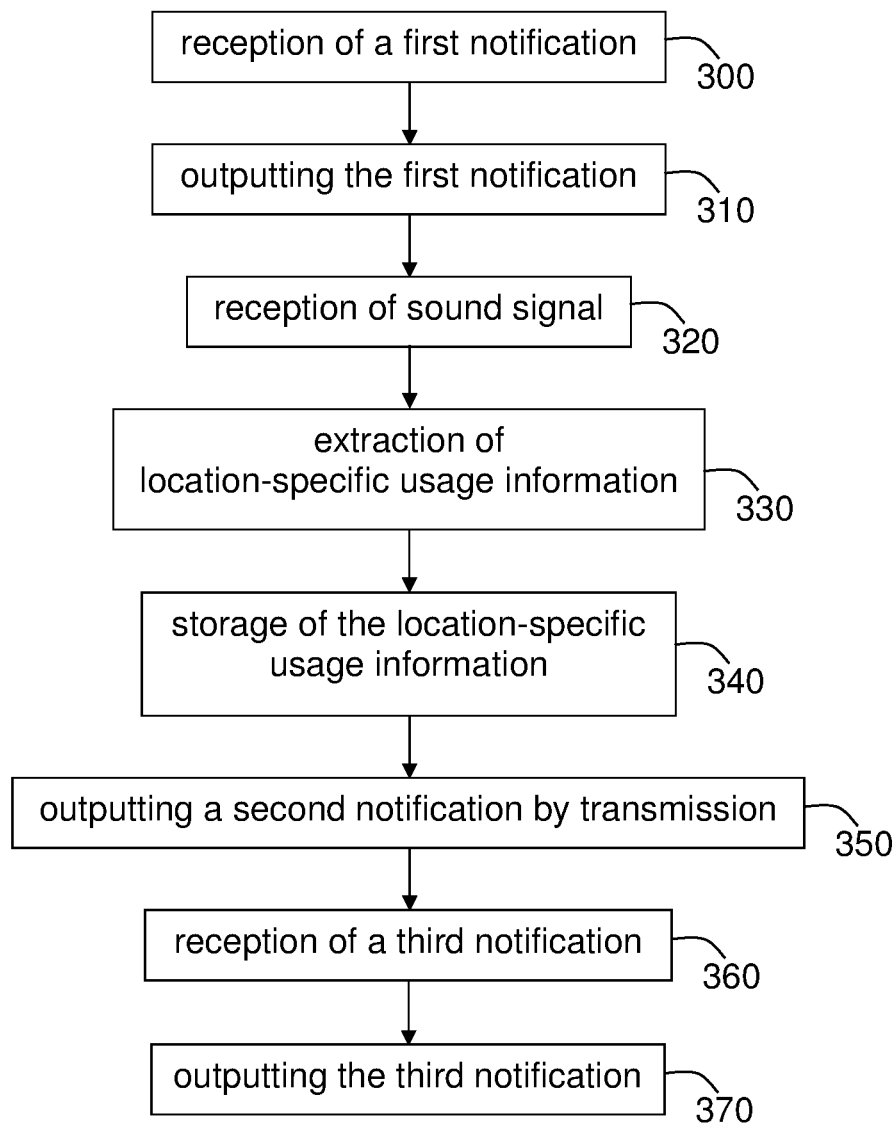
FIG. 5 is a diagram that schematically illustrates a third example of algorithm that may be implemented by a user electronic equipment according to an embodiment of the disclosure.

Also, for instance, in a variant of embodiment the output control of the second notification during a sixth operation 350 illustrated in FIG. 5 may include the transmission of this second notification by the second circuitry 18 to an external apparatus (for instance the electronic device 3) of the user 17-k. So, in this variant of embodiment the second notification is transmitted by the user electronic equipment 2 to the electronic device 3 during the sixth operation 350 to inform its user 17-k (which is also the user of the user electronic equipment 2) of the offer represented by the extracted location-specific promotional information. Indeed, the user electronic equipment 2 has been previously informed by the associated electronic device 3 that the user 17-k was using the latter (3), for instance for a vaping session, and therefore should be more quickly informed by his electronic device 3 than by his user electronic equipment 2.

In this variant of embodiment the second circuitry 18 is also configured to receive a third notification related to the location-specific promotional information from the external apparatus (here the electronic device 3) during a seventh operation 360, and then to control the output device 20 to output this received third notification during a eighth operation 370, as illustrated in FIG. 5. For instance, the third notification may be a reaction on a vaping session previously initiated. In this example, the message may be a promotional message or further incentive to remind of previous offers, and may be an offer for something extra. In particular, it is suitable for point of sale locations where vaping is allowed. So, the electronic device 3 is configured for generating a third notification related to the location-specific promotional information after having received the second notification and for transmitting this third notification to the user electronic equipment 2.

For instance, the third notification may be a text message to be displayed by a display screen of the output device 20 and/or an audio message to be played by a loudspeaker of the output device 20.

The transmission of the second and third notifications may be carried out by the respective communication interfaces of the user electronic equipment 2 and the electronic device 3 by means of a wireless communication. Such a wireless communication may be a Bluetooth communication, for instance. But this is a non-limiting example, and other types of short-range wireless communications are possible, and notably NFC, RFID, ZigBee, and Wi-Fi Direct.

Also, for instance, in an embodiment the second circuitry 18 may be configured to extract user information associated with the user 17-k based on usage of the application executable on its user electronic equipment 2, which appears to be very limitative and reassuring to the user 17-k because it does not concern any one of his user information.

For instance, the extracted user information may include identification information of the user 17-k, and/or profile information of the user 17-k, and/or the location information, and/or a purchase history of the user 17-k, and/or purchase trend information associated with the user 17-k, and/or a loyalty membership status information associated with the user 17-k, and/or a search history related to a product on the application executable on the user electronic equipment 2 of the user 17-k, and/or at least one interest of the user 17-k, and/or biometric information of the user 17-k, and and/or payment mode information associated with the user 17-k.

In this last embodiment the second circuitry 18 is configured to transmit the extracted user information to the server 25 associated with the manufacturer or distributor of the (each) concerned product. This allows to feed the server 25 with limited user information concerning only previous transactions relative to product(s) produced or sold by the concerned manufacturer or distributor, and therefore to limit the user information to which the system 1 may have access when identifying location information during a sound-based promotional campaign.

The transmission of the extracted user information to the server 25 may be based on a prior permission provided by the concerned user 17-k by means of his user electronic equipment 2, possibly via the above mentioned application.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

What is claimed is:

1. A system, comprising:
   circuitry configured to:
   identify, from a database, user information of a user based on location information associated with a merchant location, wherein
   said location information indicates said user has previously visited said merchant location;
   transmit a first notification to a user electronic equipment associated with said user at a first time instant, based on said identified user information, wherein
   said first notification includes information representative of a sound-based promotional campaign for at least one product at said merchant location,
   said user electronic equipment associated with said user is at a first location at said first time instant, and
   said first location of said user electronic equipment is at a distance greater than a threshold distance from said merchant location;
   transmit location-specific promotional information, associated with said sound-based promotional campaign and based on said user information, to a merchant electronic apparatus associated with said merchant location; and
   cause, at a second time instant, said merchant electronic apparatus to transmit said location-specific promotional information to said user electronic equipment, wherein said user electronic equipment associated with said user is within said threshold distance from said merchant location at said second time instant.

2. The system according to claim 1, wherein said location-specific promotional information includes one of encoded information to be combined with audio signals by said merchant electronic apparatus or audio signals including said encoded information.

3. The system according to claim 2, wherein said circuitry is further configured to stream said audio signals including said encoded information to said merchant electronic apparatus for playback at said merchant location.

4. The system according to claim 1, wherein said location-specific promotional information defines at least one of a discount coupon, loyalty points associated with said user information, a voucher, a digital message associated with said user information, or pointer information designating a server associated with one of a manufacturer or a distributor of said at least one product.

5. The system according to claim 1, further comprising said database configured to store said user information, and a plurality of locations associated with a plurality of pieces of location-specific promotional information including said location-specific promotional information, wherein said plurality of locations includes said merchant location.

6. The system according to claim 1, wherein said user information includes at least one of identification information of said user, profile information of said user, said location information, a purchase history of said user, purchase trend information associated with said user, loyalty membership status information associated with said user, a search history related to said at least one product on an application executable on said user electronic equipment, at least one interest of said user, biometric information of said user, or payment mode information associated with said user.

7. The system according to claim 1, wherein said circuitry is further configured to customize said location-specific promotional information based on said identified user information.

8. The system according to claim 1, wherein said circuitry is further configured to transmit said first notification to said user electronic equipment as one of a text message, an electronic mail, or an application notification via an application executable on said user electronic equipment.

9. The system according to claim 1, further comprising a server associated with one of a manufacturer or a distributor of said at least one product, wherein
   said user electronic equipment outputs a second notification related to said location-specific promotional information,
   said second notification includes pointer information that designates said server associated with one of said manufacturer or said distributor of said at least one product, and
   said server is accessible via one of an application executable on said user electronic equipment or a browser application based on said pointer information.

10. A method, comprising:
    identifying, from a database, user information of a user based on location information associated with a merchant location, wherein
    said location information indicates said user has previously visited said merchant location;
    transmitting a first notification to a user electronic equipment associated with said user at a first time instant, based on said identified user information, wherein
    said first notification includes information representative of a sound-based promotional campaign for at least one product at said merchant,
    said user electronic equipment associated with said user is at a first location at said first time instant, and
    said first location of said user electronic equipment is at a distance greater than a threshold distance from said merchant location;
    transmitting location-specific promotional information, associated with said sound-based promotional campaign and based on said user information, to a merchant electronic apparatus associated with said merchant location; and
    causing, at a second time instant, said merchant electronic apparatus to transmit said location-specific promotional information to said user electronic equipment, wherein said user electronic equipment associated with said user is within said threshold distance from said merchant location at said second time instant.

11. The method according to claim 10, wherein said location-specific promotional information includes one of encoded information to be combined with audio signals by said merchant electronic apparatus or audio signals including said encoded information.

12. The method according to claim 11, further comprising streaming said audio signals including said encoded information to said merchant electronic apparatus for playback at said merchant electronic apparatus.

13. An electronic equipment, comprising:
    circuitry configured to:
    receive a first notification based on location information of a user associated with said electronic equipment, wherein said first notification includes information representative of a sound-based promotional campaign for at least one product in at least one location known by said user;

control an output device to output said first notification via an application executable on said electronic equipment;

receive a sound signal from a sound signal output device at said at least one location, wherein said sound signal is associated with said sound-based promotional campaign and indicates location-specific promotional information associated with said at least one product;

extract said location-specific promotional information from said sound signal;

control said application to store said extracted location-specific promotional information; and control said output device to output a second notification related to said extracted location-specific promotional information.

14. The electronic equipment according to claim 13, wherein
said second notification includes pointer information designating a server associated with a manufacturer or a distributor of said at least one product, and
said circuitry is further configured to access said server via one of said application executable on said electronic equipment or a browser application based on said pointer information.

15. The electronic equipment according to claim 13, wherein said circuitry is further configured to:
receive a third notification related to said location-specific promotional information from an external apparatus; and
control said output device to output said received third notification.

16. The electronic equipment according to claim 13, wherein said sound signal includes one of an inaudible sound signal or an audible sound signal.

17. The electronic equipment according to claim 13, wherein said circuitry is further configured to receive said sound signal within a predefined distance range from said sound signal output device.

18. The electronic equipment according to claim 13, wherein said location-specific promotional information defines at least one of a discount coupon, loyalty points associated with user information, a voucher, a digital message associated with said user information, or pointer information designating a server associated with a manufacturer or a distributor of said at least one product.

19. The electronic equipment according to claim 13, wherein said circuitry is further configured to:
extract user information associated with said user based on usage of said application executable on said electronic equipment, wherein said extracted user information includes at least one of identification information of said user, profile information of said user, said location information, a purchase history of said user, purchase trend information associated with said user, loyalty membership status information associated with said user, a search history related to said at least one product on said application executable on said electronic equipment, at least one interest of said user, biometric information of said user, or payment mode information associated with said user; and
transmit said extracted user information to a server associated with a manufacturer or distributor of said at least one product.

* * * * *